United States Patent
Gras et al.

(10) Patent No.: US 12,319,399 B2
(45) Date of Patent: Jun. 3, 2025

(54) WINDSHIELD ARCHITECTURE AND AIRCRAFT PROVIDED WITH SUCH A WINDSHIELD

(71) Applicant: Airbus Operations SAS, Toulouse (FR)

(72) Inventors: Jérôme Gras, Toulouse (FR); Johan Dentesano, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 7 days.

(21) Appl. No.: 18/307,243

(22) Filed: Apr. 26, 2023

(65) Prior Publication Data
US 2023/0348037 A1 Nov. 2, 2023

(30) Foreign Application Priority Data
Apr. 28, 2022 (FR) ........................ 2204031

(51) Int. Cl.
*B64C 1/14* (2006.01)
(52) U.S. Cl.
CPC .................. *B64C 1/1492* (2013.01)
(58) Field of Classification Search
CPC .... B64C 1/1484; B64C 1/1492; B64C 1/1476
See application file for complete search history.

(56) References Cited

U.S. PATENT DOCUMENTS

| | | | | |
|---|---|---|---|---|
| 2,293,656 A | * | 8/1942 | McClain | B64C 1/1492 52/204.597 |
| 2,808,355 A | * | 10/1957 | Christie | B32B 17/10036 156/92 |
| 3,382,630 A | * | 5/1968 | Chivers | E06B 3/5436 411/537 |
| 8,033,505 B2 | | 10/2011 | Wieting | |
| 2003/0062450 A1 | | 4/2003 | Dazet et al. | |
| 2013/0095311 A1 | * | 4/2013 | Rukavina | C08G 18/3872 428/221 |
| 2015/0047275 A1 | * | 2/2015 | McCarthy | B64C 1/14 52/204.51 |
| 2017/0150659 A1 | * | 5/2017 | Uprety | H05K 9/0094 |
| 2020/0015358 A1 | * | 1/2020 | Brandt | H05B 3/00 |
| 2020/0298952 A1 | | 9/2020 | Chiriac | |
| 2022/0410539 A1 | * | 12/2022 | Tondu | B32B 27/40 |

FOREIGN PATENT DOCUMENTS

| | | | |
|---|---|---|---|
| FR | 2830236 A1 | 4/2003 | |
| WO | WO-2021099741 A1 * | 5/2021 | ....... B32B 17/10018 |

OTHER PUBLICATIONS

French Search Report and Written Opinion for French Patent Application 2204031 dated Dec. 21, 2022; priority document.

* cited by examiner

*Primary Examiner* — Christopher D Hutchens
(74) *Attorney, Agent, or Firm* — Greer, Burns & Crain, Ltd.

(57) ABSTRACT

A windshield architecture with window including at least one ply of material that is transparent and of mineral origin and having a peripheral edge. At least one of the mineral material plies of the window is coated with a coating layer of viscoelastic transparent organic material over an entire surface of the play, including the peripheral edge.

13 Claims, 3 Drawing Sheets

WINDSHIELD ARCHITECTURE AND AIRCRAFT PROVIDED WITH SUCH A WINDSHIELD

CROSS-REFERENCES TO RELATED APPLICATIONS

This application claims the benefit of the French patent application No. 2204031 filed on Apr. 28, 2022, the entire disclosures of which are incorporated herein by way of reference.

FIELD OF THE INVENTION

The present invention relates to an aircraft windshield and an aircraft provided with such a windshield. The invention applies to all types of aircraft provided with a windshield and notably civil and military airplanes and helicopters.

BACKGROUND OF THE INVENTION

In most aircraft, the windshield comprises a window comprising several plies of various transparent materials that make it possible to offer structural characteristics suited to the necessary mechanical strength. The windows must, in fact, withstand pressure and temperature variations, impacts of various natures (birds, hail, scratches, abrasion, etc.). The transparent materials used can be of mineral origin (glass, quartz, silica, . . . or a combination thereof) or of organic origin (acrylic, polycarbonate, resins, polymethylmethacrylate, more commonly called Plexiglas (registered trademark), . . . or a combination thereof). The windows may also comprise a combination of plies of organic origin and a ply of mineral origin, generally glass positioned outermost; one of its faces is therefore in the open air. The windows are fixed in an opening formed in the structure of the nose of the aircraft, at the cockpit on a suitable framework forming part of the structure of the aircraft. The windows can be pinched at their peripheral rim between the framework and tightening flanges that are secured to the structure of the aircraft using fixings of screw-nut type for example, or directly bolted at their peripheral rim to the framework.

According to the example described in the patent FR2830236 filed by Airbus France SAS and one of the figures of which has been extracted and represented in FIG. 1, the windshield comprises a window comprising several plies 10 of various transparent materials. The thickest plies are called structural plies. A glue 30 covers the different surfaces in contact so as to bond them together. The window is fixed in an opening formed in the structure of the nose of the aircraft, at the cockpit on a suitable framework 12. The window is pinched at its peripheral rim between the framework 12 and a tightening flange 14 secured to the structure of the aircraft using fixings of screw-nut type 16. This type of assembly is called a flange assembly. It requires the addition of elements such as a flange at the periphery making assembly complex but possible for windows with structural plies made of material of mineral origin.

The various strains to which the windshields are subjected necessitate the use of materials determined from among those mentioned above. Thus, a window having structural plies made of material of organic origin will generally be fixed to the structure of the aircraft by a direct bolting principle, the flexibility of the materials allowing it. A window that has structural plies made of a material of mineral origin will preferably be fixed to the structure according to the flange assembly principle of the type of that described above in the patent mentioned allowing bolt fixing outside of the plies without passing through them.

SUMMARY OF THE INVENTION

The present invention aims to propose a novel windshield architecture with a window having at least one inner ply made of mineral material making it possible to mitigate all the abovementioned drawbacks and notably making it possible to choose the type of assembly more freely.

To this end, the present invention relates to an aircraft windshield comprising a window comprising at least one ply of material that is transparent and of mineral origin and having a peripheral edge, characterized in that at least one of the plies of the window made of mineral material is/are coated with a coating layer of viscoelastic transparent organic material over all of its/their surface(s) including the peripheral edge.

The coating of plies made of mineral material of a window by a layer of viscoelastic material makes it possible to protect them by reinforcing their solidity. Moreover, the coating layer is used to enhance the seal-tightness and facilitate the assembly of the windshield on the airplane structure by allowing, for example, a fixing by direct bolting despite the use of plies made of mineral material.

The invention provides at least one of the following optional features, taken alone or in combination.

Each of the plies made of mineral material of the window is coated.

An uncoated outer ply made of mineral material is provided, of which the outermost face of the window and the inner face is attached to the outer face of the outermost coating layer via a glue and each of the inner plies is coated.

The coating layer forms a one-piece jacket.

The coating layer is made of Opticor (registered trademark) material.

The coating layer comprises an extension on all of the peripheral edges of the ply which has a through-opening.

The mineral material is glass.

The present invention relates also to an aircraft comprising a framework forming part of the primary structure of the aircraft and a windshield associated with the framework having one or more of the abovementioned features.

According to a first embodiment, the coated ply or plies and the coating layer are held using a flange fixing.

According to a second embodiment, fixing means of screw-nut type pass through the extension through the opening to tighten the coating layer and the coated ply or plies.

BRIEF DESCRIPTION OF THE DRAWINGS

Other aims, features and advantages will emerge from the following description of the invention, a description given purely as a nonlimiting example with reference to the attached drawings in which.

DETAILED DESCRIPTION OF THE PREFERRED EMBODIMENTS

Figure 1:
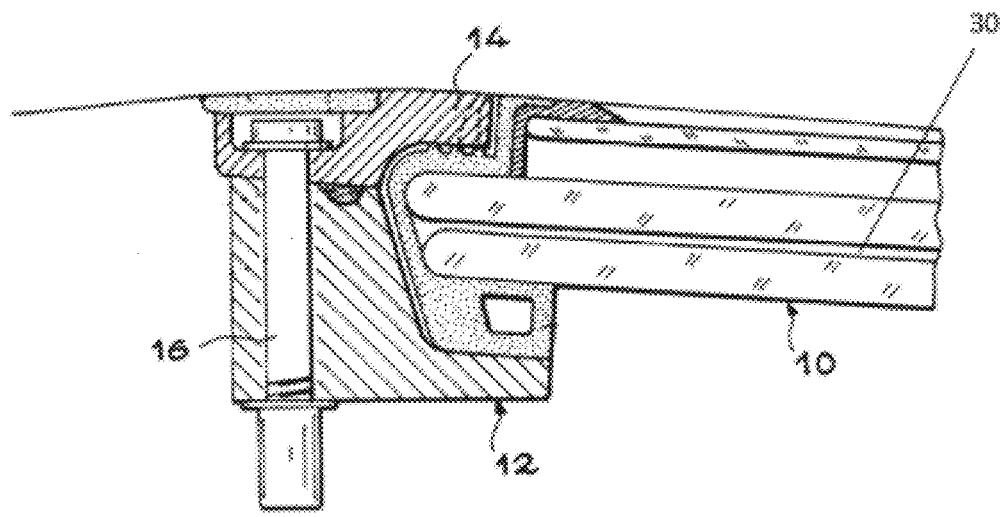
FIG. 1 is a plan view in cross-section of a windshield according to the prior art.
Figure 2:
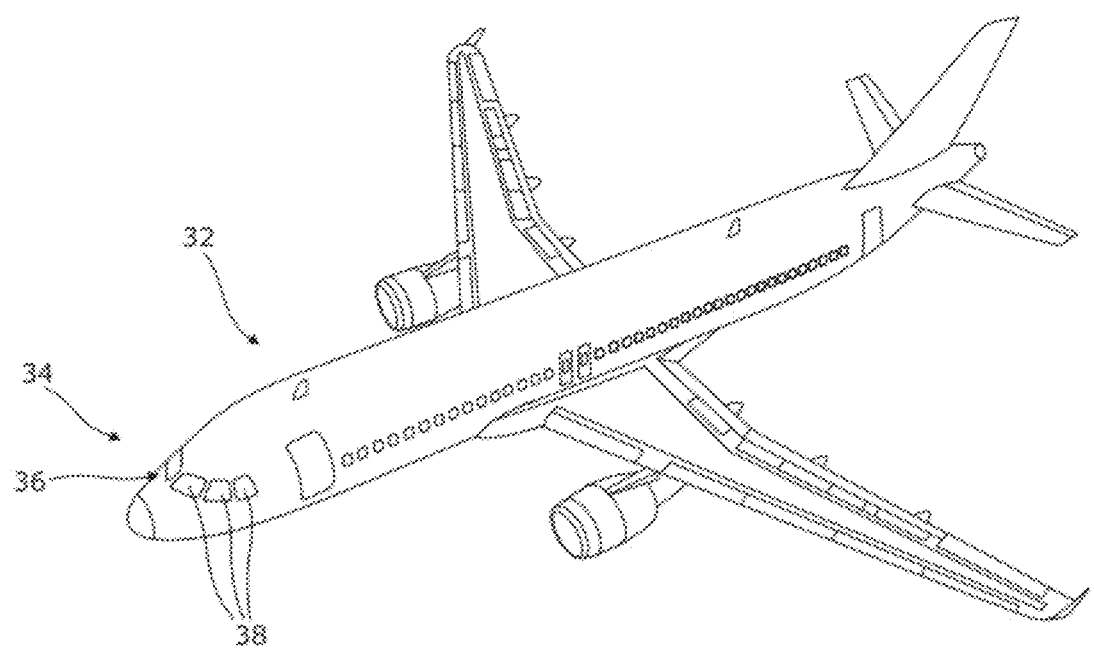
FIG. 2 is a perspective view of an aircraft provided with a windshield according to the present invention.
Figure 3:
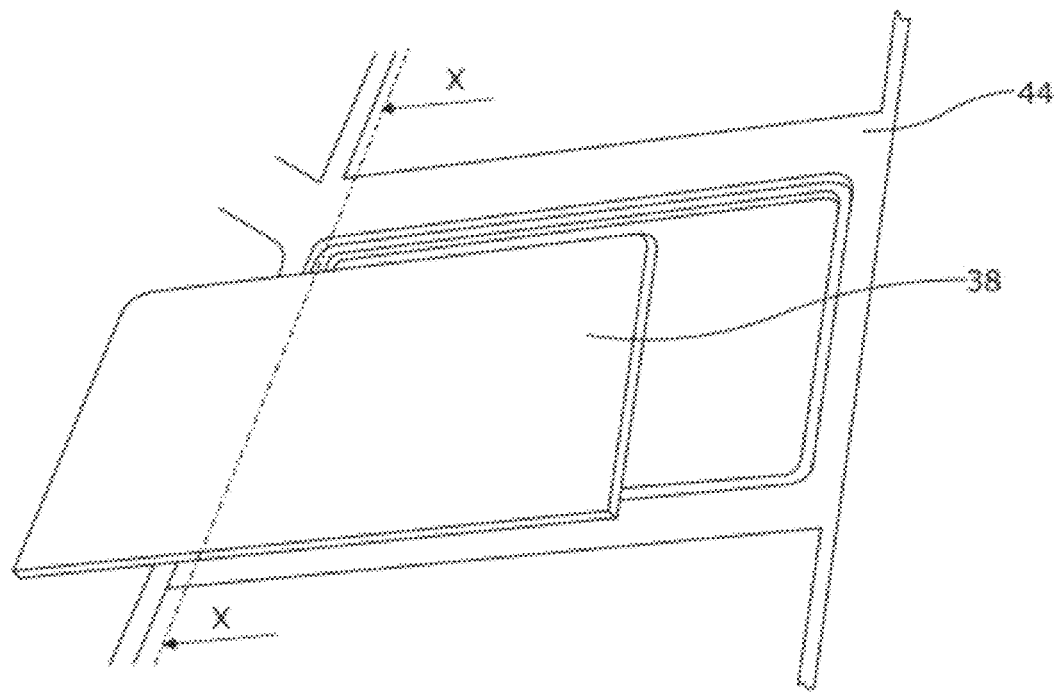
FIG. 3 is an exploded perspective view of a window of a windshield and of an aircraft framework according to the present invention.
Figure 4:
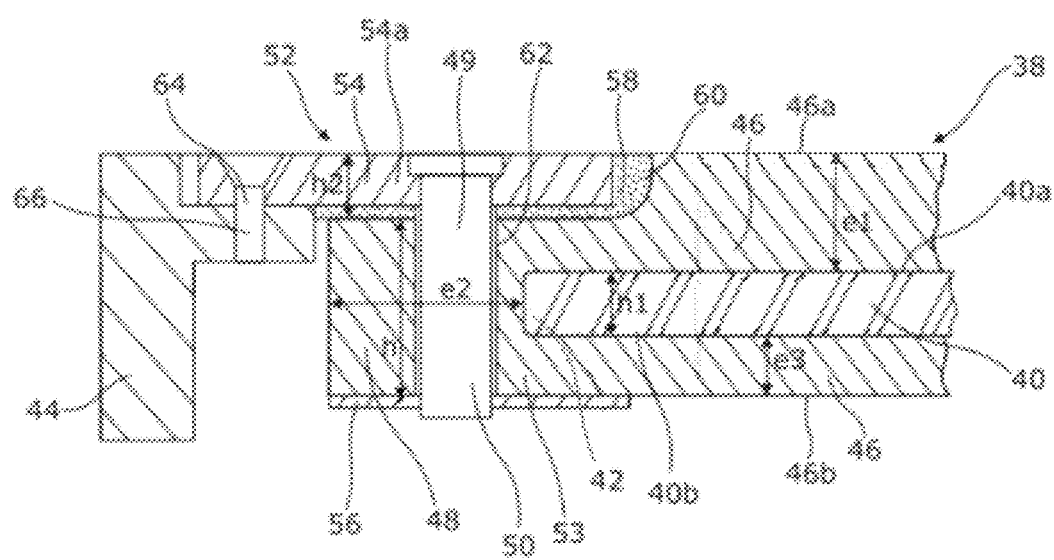
FIG. 4 is a plan view in cross-section on a plane such as the plane X-X represented in FIG. 3 of a first embodiment of a windshield according to the present invention.
Figure 5:
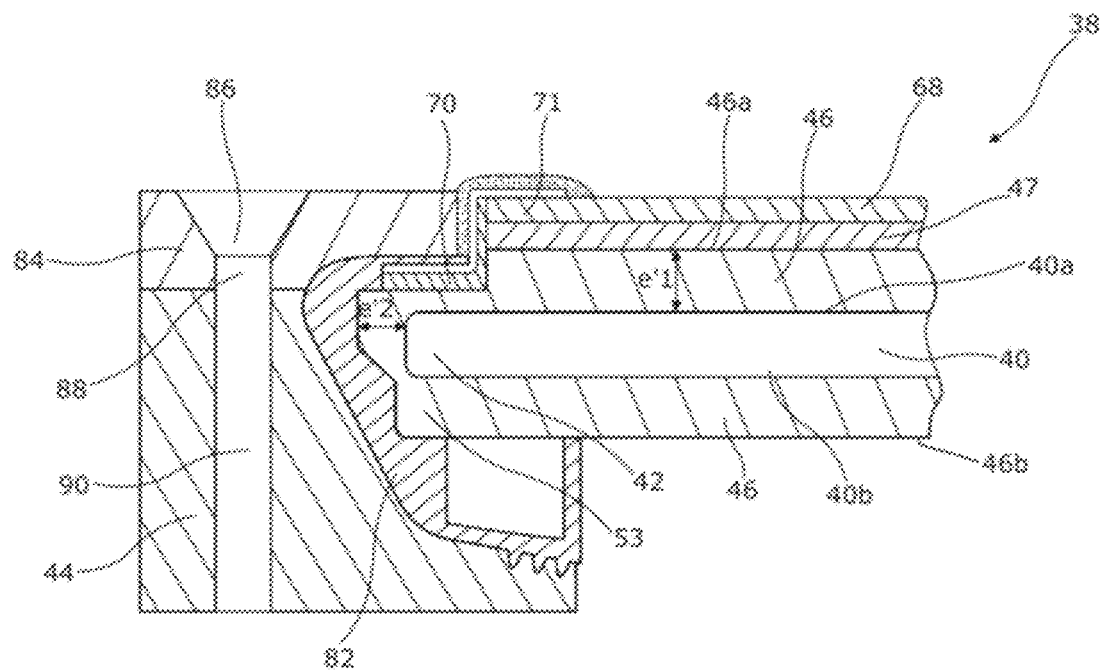
FIG. 5 is a plan view in cross-section on a plane such as the plane X-X represented in FIG. 3 of a second embodiment of a windshield according to the present invention.
Figure 6:
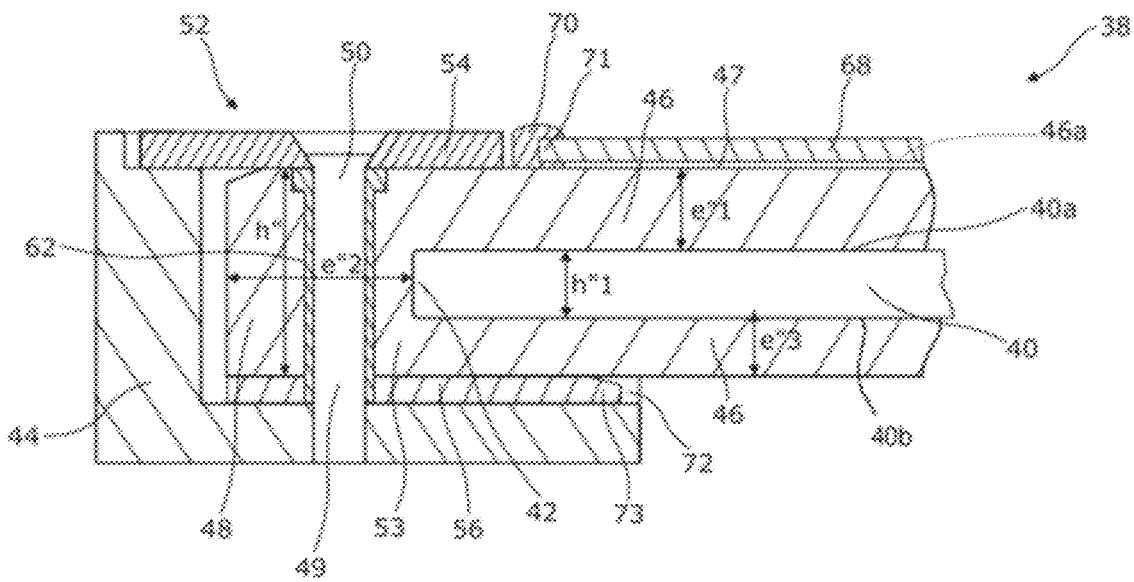
FIG. 6 is a plan view in cross-section on a plane such as the plane X-X represented in FIG. 3 of a third embodiment of a windshield according to the present invention.

FIG. 2 represents an aircraft 32 comprising a nose 34 in which there is a cockpit. The nose 34 comprises a windshield 36 provided with at least one window 38. As shown in FIGS. 4 to 6, at least one window 38 of the aircraft windshield 36 comprises at least one ply 40 of transparent material of mineral origin. The ply or plies 40 have a peripheral edge 42. The ply or plies 40 have an outer face 40a turned towards the outside of the aircraft as opposed to the inner face 40b turned towards the cockpit. The terms outer/inner will be used hereinafter in the description to indicate, for the term outer, a greater proximity with the outside of the aircraft and, for the term inner, a greater proximity with the inside of the aircraft, i.e., in the example illustrated, the cockpit. In the example illustrated (FIGS. 3 to 6), the window 38 comprises a ply 40 made of transparent mineral material and, in the example illustrated, of glass. The window 38 is fixed to the primary structure of the aircraft 32 and more specifically to a part called a framework 44 which forms a part thereof by a fixing system explained later. The framework 44 encircles the window 38.

According to the present invention, as shown in all the embodiments given purely by way of illustration in FIGS. 4 to 6, at least one ply 40 of the window 38 made of transparent mineral material is (are) coated with a so-called coating layer 46 of viscoelastic transparent organic material over all of its/their surfaces including the/their peripheral edge 42. The coating layer 46 completely jackets the ply 40. The coating layer 46 has an outer face 46a closest to the environment outside of the aircraft and an inner opposite face 46b. Because of this, the ply 40 made of mineral material, here of glass, is entirely protected and its solidity is reinforced and its life prolonged. The coating layer 46 of transparent viscoelastic organic material forms a one-piece protective jacket. The transparent viscoelastic organic material could, for example, be Opticor (registered trademark) advanced transparency plastic material produced by PPG Aerospace. The assembly is obtained by molding in a mold designed for the assembly to be fitted perfectly to the framework. When several coated plies are superposed to form the window, a glue 47 is used for the plies to adhere to one another as illustrated in FIGS. 5 and 6. As an illustration, the glue is a polyvinyl butyral glue, called PVB glue. According to a particular form of the invention, the glue 47 can also be applied to all of the surface of the ply, namely the faces 40a and 40b and the peripheral edge 42 in order to enhance the overall cohesion.

When an assembly by direct bolting is used to fix the window 38 to the framework 44 as in FIGS. 4 and 6, the coating layer 46 is prolonged, by what is called extension 48, at the peripheral edge 42 of the ply over its entire circumference. The coating layer 46 has a thickness e2 (FIG. 4), e"2 (FIG. 6) that is greater at the peripheral edge 42 of the ply to form this extension 48. The extension 48 has through-orifices 49 distributed over the entire circumference of the ply and, according to one possible form, evenly distributed at least over most of the extension. As indicated above, in all the embodiments described below, only one inner ply 40 is provided for simplicity in the description, but several coated plies could be provided. Elements that are identical retain the same references from one embodiment to another.

In the example of FIG. 4, the thickness of the coating layer is uniform over the entire surface of each face 40a, 40b of the ply 40 but differs from one face 40a (thickness e1) to the other 40b (thickness e3). The thickness e1 on its outer face 40a is greater than the thickness e3 on its inner face 40b so as to allow the incorporation of a retaining device 52. The retaining device 52, comprising an outer plate 54 and an inner plate 56, made, for example, of metal and, by way of illustration, of aluminum, makes it possible to sandwich the peripheral edge 53 of the coating layer 46 with the peripheral edge 42 of the ply 40. The coating layer 46 is hollowed out at the peripheral edge 53 of its outer face 46a. The cavity 58 that is formed, open on the outside, makes it possible to receive, on the coating layer 46, the outer plate 54 of the retaining device 52 so that its outer face 54a is flush with the outer face 46a of the coating layer. The space between the outer plate 54 of the retaining device and the coating layer 46 is filled with a seal 60. At the through-orifice 49, the extension has a thickness h equal to the sum of the thickness of the ply h1 and of the thickness of the coating layer e1 and e3 of the two sides of the ply 40, minus the thickness h2 of the cavity 58 and of the seal 60. The outer plate 54 is intended to be attached to the outer face 46a of the coating layer and the inner plate 56 to the inner face 46b of the coating layer. The assembly of the retaining device 52, of the seal 60, of the coating layer 46 and of the ply is tightened and fixed together using a bolt 50 (of screw-nut type). A spacer 62 makes it possible to keep the plates 54, 56 of the retaining device 52 apart, the seal 60 filling the free space as seen previously. The outer plate 54 of the retaining device is of a length such that it extends beyond the peripheral edge 53 outside of the coating layer to rest on the framework 44. Another through-opening 64 is provided in the outer plate 54 for bolting fixing means 66 between the plate 54 and the framework 44 for the fixing of the plate on the framework.

FIG. 6 presents another embodiment of joining by direct bolting. Identical elements appear again and retain the same reference as the retaining device 52 composed of an outer plate 54 and an inner plate 56 and the spacer 62. The difference with respect to the embodiment of FIG. 4 consists of the presence of an uncoated outer ply 68 made of mineral material and the fact that the inner ply is tightened with the coating layer and the window is fixed to the framework by the same fixing means. In the example of FIG. 6, the thickness e"1, e"3 of the coating layer is uniform over the entire surface of each face 40a, 40b of the ply and different from one face to another, namely, the thickness e"1 is different from the thickness e"3. They could be of identical thickness. At the through-opening 49, the thickness h" of the extension corresponds to the sum of the thickness of the ply h"1 and of the thickness e"1, e"3 of the coating layer of the two sides of the ply. In this way, a continuity of thickness of the window formed by the coated ply is obtained at the extension 48. The outer ply 68 is fixed to the coating layer of the inner ply 40 using the glue 47 described above. The outer ply 68 has, in the two longitudinal and lateral directions, a dimension less than the inner ply 40. It is protected by a seal 70 all along its peripheral edge 71; the seal 70 is provided on the outer face 46a of the coating layer; it is fixed between the outer plate 54 and the outer ply 68 to ensure the seal-tightness. A seal 72 is also provided at the inner peripheral edge 73 of the inner plate 56 of the retaining device 52 in order to prevent the ingress of water into the aircraft and avoid pressure losses in the cockpit. In the embodiment illustrated, the seals 70 and 72 are one-piece. They can be made of silicone. In this embodiment, the inner 56 and outer 54 plates of the retaining device, the extension 48 and the framework 44 have aligned through-orifices 49: the assembly is held using a bolt 50 matched to the orifice 49.

According to another flange fixing embodiment represented in FIG. 5, the window comprises two plies, an inner ply 40 and an outer ply 68. Only the inner ply 40 is coated. The outer ply 68 is composed of a mineral material (as in the example of FIG. 6). The outer ply 68 has, in the two longitudinal and lateral directions, a dimension less than the inner ply 40. It is protected by a seal 70 all along its peripheral edge 71 and retained on the coated inner ply 40 by the glue 47 provided on its inner face. The peripheral edge 42 of the coated inner ply 40 is surrounded by a seal 82. In the embodiment illustrated, the seals 70 and 82 are one-piece. They can be made of silicone. The peripheral edge 53 of the window and, more specifically, the seal 82, is sandwiched, inserted between the framework 44 and a flange 84, the form of which hugs that of the framework 44: the form of the flange 84 also hugs the form of the peripheral edge 53 of the window surrounded by the seal 82. The flange 84 in the example illustrated is fixed onto the framework 44 by means of a bolt 86 penetrating into a through-orifice 88 of the flange and a through-orifice 90 of the framework 44 that is aligned so as to block the peripheral edge of the window between the flange and the framework. The framework and the flange are held together and tightened against one another using the bolt 86. The framework 44 and the flange 84 form a clamp in which the coated inner ply 40 is held by its peripheral edge 42. The seals 70 and 82 completely jacket the peripheral edge of the window so that it is not in direct contact with the framework 44 and the flange 84. The flange 84 is, for example, produced in a metal, by known machining means. When the flange 84 is tightened onto the framework 44 by the bolt 86, the seal 82 encircling the peripheral edge 42 of the window is compressed so as to ensure the seal-tightness between the inside and the outside of the aircraft over the entire perimeter of the window. Additional seals can be provided to reinforce or complement this seal-tightness. The dimension of the outer ply 68 is such that the ply jacketed in the seal 70 is nested in the opening offered by the flange 84. The other inner ply 40 overlaps towards the structure of the aircraft with respect to the outer ply 68. The outer ply 68 held by the seal adjoins the free end of the flange 84.

Any other form of fixing of the window comprising one or more plies made of coated mineral material to the primary structure is possible. The examples provided are given only as an illustration of application to the window with plies made of coated mineral material.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft windshield comprising a window comprising
an outer ply having an inner face and an outer face, the outer face of the outer ply is an outermost face of the window;
at least one inner ply of material that is transparent and of mineral origin and having a peripheral edge, wherein the at least one inner ply is coated with a coating layer of viscoelastic transparent organic material over an entire surface of the at least one inner ply, including the peripheral edge thereof; and
wherein the inner face of the outer ply is attached to the coating layer of the at least one inner ply via a glue, the glue being a different material than the coating layer.

2. The aircraft windshield according to claim 1, further comprising a plurality of inner plies, each inner ply being transparent and of mineral origin and having a peripheral edge and coated with a coating layer of viscoelastic transparent organic material over an entire surface of the inner ply, including the peripheral edge thereof.

3. The aircraft windshield according to claim 1,
wherein the outer ply is made of non-coated mineral material.

4. The aircraft windshield according to claim 1, wherein the coating layer forms a one-piece jacket.

5. The aircraft windshield according to claim 1, wherein the coating layer is made of Opticor (registered trademark) material.

6. The aircraft windshield according to claim 1, wherein the coating layer comprises an extension at all peripheral edges of the at least one inner ply, the extension having a through-opening configured to receive a fixing.

7. The aircraft windshield according to claim 1, wherein the material of mineral origin comprises glass.

8. An aircraft comprising
a framework forming part of a primary structure of the aircraft, and
a windshield associated with said framework according to claim 1.

9. The aircraft according to claim 8, wherein the at least one coated ply and the coating layer are held using a flange fixing.

10. The aircraft according to claim 8,
wherein the coating layer comprises an extension at all peripheral edges of the at least one inner ply, the extension having a through-opening configured to receive a fixing,
wherein the fixing comprises a screw-nut type which passes through the extension through the through-opening to tighten the coating layer and the at least one inner ply.

11. The aircraft according to claim 10, wherein the fixing fixes the windshield to the framework.

12. The aircraft according to claim 8, further comprising a seal in between the framework and the windshield.

13. The aircraft windshield according to claim 1, wherein the coating layer comprises an extension at all peripheral edges of the at least one inner ply, the extension having a through-opening configured to receive a fixing,
wherein the fixing comprises a screw-nut type which passes through the extension through the through-opening to tighten the coating layer and the at least one inner ply.

* * * * *